Patented Sept. 30, 1924.

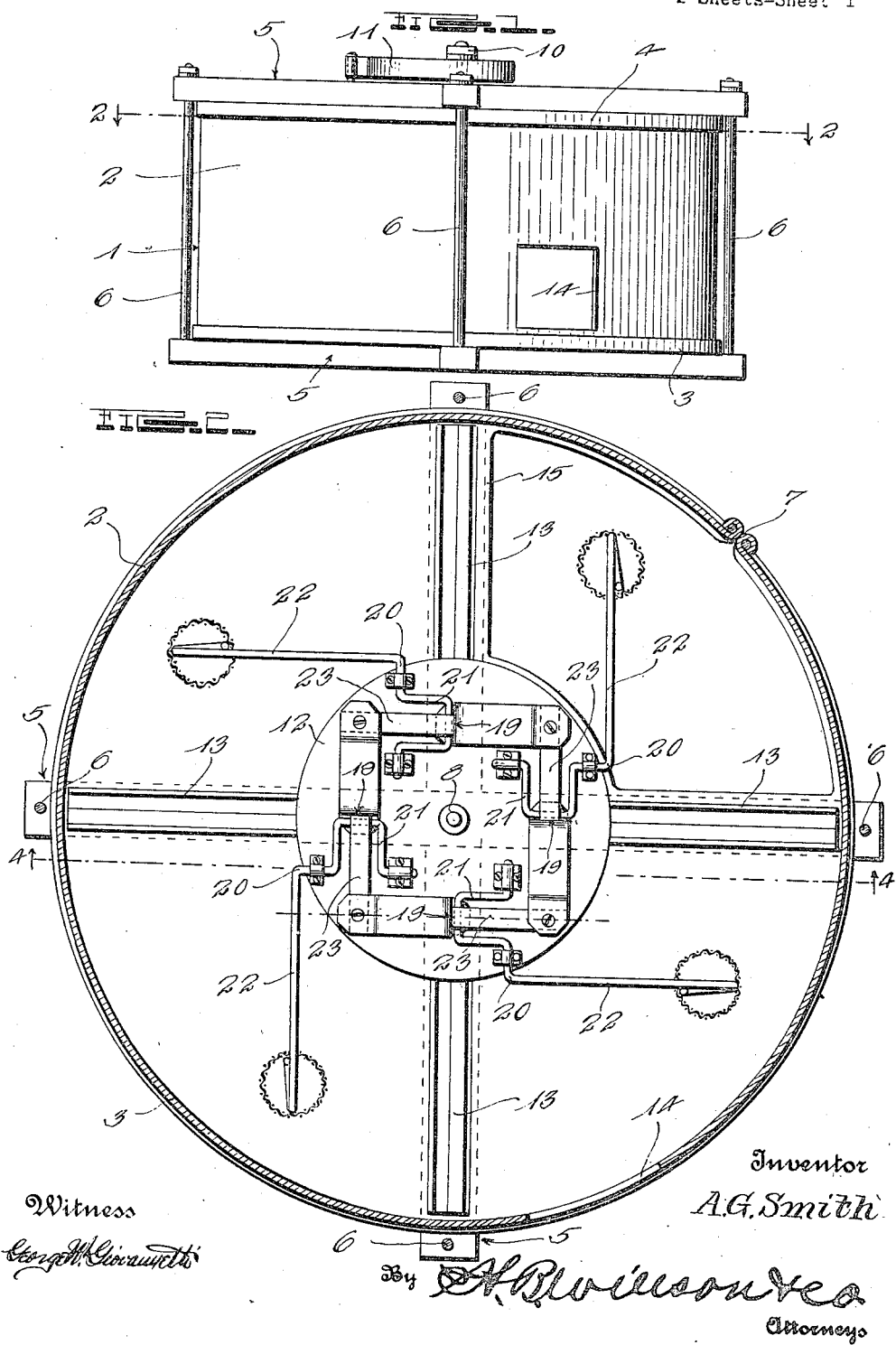

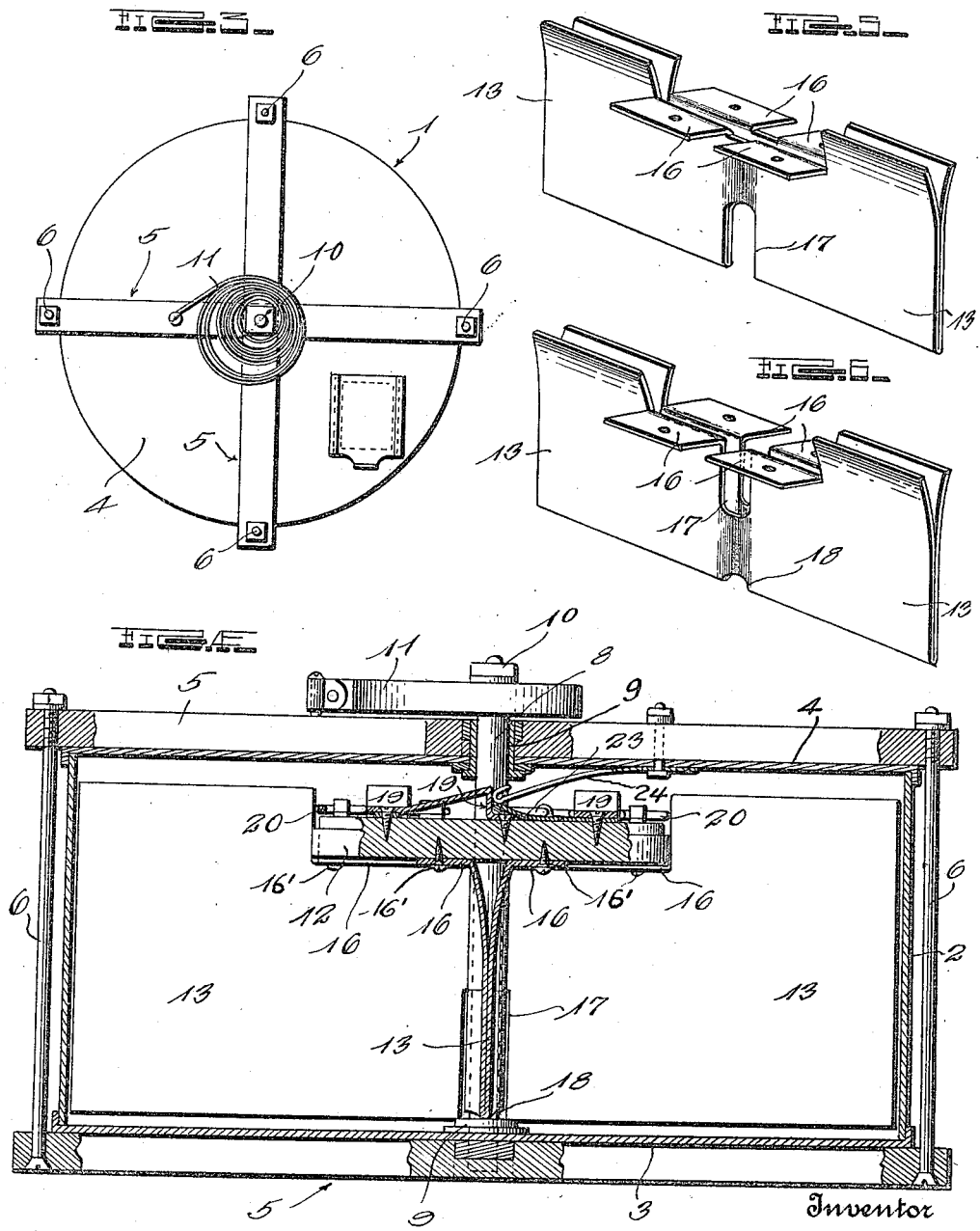

1,510,346

UNITED STATES PATENT OFFICE.

ALBERT G. SMITH, OF NEW CONCORD, KENTUCKY.

TRAP.

Application filed August 27, 1923. Serial No. 659,628.

*To all whom it may concern:*

Be it known that I, ALBERT G. SMITH, a citizen of the United States, residing at New Concord, in the county of Calloway and State of Kentucky, have invented certain new and useful Improvements in Traps; and I do declare the following to be a full, clear, and exact description of the invention, such as will enable others skilled in the art to which it appertains to make and use the same.

My invention relates to improvements in traps for mice, rats and other small animals, and the principal object is to provide an exceptionally simple and inexpensive, yet an efficient and reliable trap which will be self-setting, in readiness for the next catch, whenever an animal is caught.

In carrying out the above end, a spring-rotated shaft extends coaxially into a cylindrical casing which is provided with an inlet and an outlet, the two being spaced apart circumferentially. This shaft carries radial wings, the space between two of these wings being always in communication with the inlet, so as to receive an incoming rat or other animal. When a bait-carrying trigger, however, is operated, the shaft and wings rotate, thus entrapping the animal and moving him to the outlet from the casing. Further objects are to provide a unique trigger-controlled means for stopping rotation of the shaft and wings after each operation of the trap, and for again setting these parts in rotation when another catch is made, and to construct the wings in an exceptionally simple yet rigid manner.

With the foregoing in view, the invention resides in the novel subject matter hereinafter described and claimed, the description being supplemented by the accompanying drawings.

Figure 1 is a side elevation of the trap construction according to my invention.

Figure 2 is a horizontal sectional view as indicated by line 2—2 of Fig. 1.

Figure 3 is a top plan view.

Figure 4 is a vertical sectional view cut substantially on line 4—4 of Fig. 2.

Figures 5 and 6 are perspective views showing the manner of constructing the wings.

The casing of the trap, designated by the numeral 1, preferably comprises a cylindrical side wall 2, a flanged bottom 3, and a similar top 4 applied to said wall, appropriate end frames 5 contacting with the outer sides of said bottom and top, and tie-bolts 6 at the outer side of the wall 2, for clamping said frames 5 in place and consequently holding the top and the bottom in engagement with the side wall. This construction permits the trap to be readily knocked down for easy crating and shipment. If desired, the side wall 2 may be formed of a single sheet of metal with its end detachably connected as indicated at 7 in Fig. 2, permitting the sheet to be laid out flat for crating.

A vertical shaft 8 is disposed coaxially in the casing 1 and is rotatably mounted at its ends in appropriate bearings 9, the upper end of said shaft being detachably connected at 10 to a helical spring 11 which is connected with the upper frame 5. This shaft carries a horizontally disposed circular head 12 which is spaced downwardly to a slight extent from the top 4, and upright wings 13 radiate from the head and shaft to the wall of the casing. These wings are always set, so that the space between two of them communicates with an inlet opening 14 in one side of the casing, while the next adjacent space, is then in communication with an outlet opening 15 (Fig. 2) which is preferably in the bottom 3 and which is formed by cutting out a segmental shaped piece of the bottom. The opening being substantially the size of the space between two of the wings 13. Thus, when an animal is moved around in the casing by one of the wings 13, he drops through the outlet 15 into a suitable receptacle below (not shown).

I prefer to employ four of the wings 13, and in constructing each pair of opposed wings, I in most instances, make use of a single metal sheet bent into substantially V-shape, the central upper portions of the edges of the sheet, being bent horizontally outward as indicated at 16 and secured to the lower side of the head 12, by screws or the like 16'. The upper edge of one sheet and the lower edge of the other sheet, are vertically notched as indicated at 17, so that said sheets may tightly interfit at their centers. The side portions of the V-shaped sheet are in spaced relation and bulged outwardly midway between their ends to form substantially tubular passages to receive the shaft 8 and the lower edge of one sheet is formed with an opening 18 through which the shaft passes.

By constructing the wings in the manner shown and described, they will be simple and inexpensive, yet will be rigidly held in place and will consequently be very effective.

For controlling the rotation of the wings 13 and shaft 8, I make the following provision: The upper side of the head 12 is provided with circumferentially spaced shoulders 19, which are equal in number to the wings 13, said shoulders being preferably formed of metal straps bent into the shape disclosed in Figs. 2 and 4. Adjacent each shoulder 19, a rock shaft 20 is mounted on the support 12, each rock shaft having an eccentric portion 21 extending into close relation with the adjacent shoulder 19 and being also provided with a bait-carrying trigger arm 22, disposed between two of the wings 13. To normally hold the eccentric portions 21, downwardly in an inoperative position, I prefer to secure suitable springs 23 to the head of 12.

The shoulders 19 are adapted to successively coact with a relatively stationary stop arm 24 on the cover which is preferably formed of spring metal, to return to its normal lowered position, after it has been released. When lowered, the arm 24 engages one of the shoulders 19 as shown in Fig. 4 and then overlies the adjacent spring 23, so that when an animal enters the trap and rocks the shaft 20 associated with this spring, the latter will be raised, thus releasing the arm 24 from engagement with the shoulder 19 and causing rotation of the wings and associated parts under the influence of the spring 11. Thus, the entrapped animal is moved around in the casing and dropped through the outlet opening 15. As soon as the shoulder 19 clears the arm 24, the latter returns to its lowered position and thus stops rotation of the wings and other parts, by engagement with the next shoulder. Thus, the trap is again set for operation.

The trap may be baited through a suitable door in its top and the wings and shaft may be retrogradely rotated during this operation to rewind the spring.

By providing the construction shown and described or a substantial equivalent thereof, a simple and inexpensive trap is provided, which will be highly efficient and desirable, and may be easily knocked down for shipment and again set up for use.

As excellent results are obtainable from the details disclosed, they may be followed if desired, but within the scope of the invention as claimed, numerous minor changes may be made.

I claim:—

1. A trap comprising a cylindrical casing having an inlet and outlet spaced apart circumferentially, a spring-rotated shaft extending coaxially into said casing and having a plurality of radial wings extending to the casing wall, a support rotatable with the shaft and disposed at the upper edges of said wings, said support having circumferentially spaced stop shoulders equal in number to said wings, a movable stop stationarily mounted with respect to said stop shoulders and co-operable therewith, and releasing devices for said movable stop movably mounted on the support adjacent said stop shoulders and having extended bait-carrying triggers between said wings.

2. A trap comprising a cylindrical casing having an inlet and an outlet spaced apart circumferentially, a spring-rotated shaft extending coaxially into said casing and having a plurality of radial wings extending to the casing wall, a support rotatable with the shaft and disposed at the upper edges of said wings, said support having circumferentially spaced stop shoulders equal in number to said wings and disposed at the upper side of the support, substantially radial rock shafts mounted on said support adjacent said shoulders and having eccentric portions in front of the latter, the outer ends of said rock shafts having extended bait-carrying triggers between said wings, and a self-lowering stop stationary with respect to said shoulders and adapted to successively engage them and the eccentric portions of the adjacent rock shafts.

3. A trap comprising a cylindrical casing having an inlet and an outlet spaced apart circumferentially, an intermittently-rotatable trigger-controlled shaft extending coaxially into said casing and having a head under the casing top, and a plurality of radial wings in the casing each formed of sheet metal bent into substantially V-shape and having upper edge portions bent outwardly and secured to the lower side of said head.

4. A structure as specified in claim 3; each V shaped sheet of metal extending diametrically across the casing and having its two side portions spaced apart and bulged outwardly midway between their ends thereby forming substantially tubular passages to receive said shaft, the metal forming the sides of said passages of each sheet being vertically notched to interfit centrally with the adjacent V shaped sheet.

In testimony whereof I have hereunto affixed my signature.

ALBERT G. SMITH.